United States Patent
Hansen et al.

(12) 
(10) Patent No.: US 6,276,637 B1
(45) Date of Patent: Aug. 21, 2001

(54) METHOD FOR RESCUING PERSONS IN AN AIR EMERGENCY BY MEANS OF AN EJECTION SEAT

(75) Inventors: Holger Hansen; Andreas Sedlmayr, both of Hamburg; Heinrich von Paulgerg, Wörthsee, all of (DE)

(73) Assignee: Autoflug GmbH & Co. (DE)

( * ) Notice: Subject to any disclaimer, the term of this patent is extended or adjusted under 35 U.S.C. 154(b) by 0 days.

(21) Appl. No.: 09/452,899

(22) Filed: Dec. 1, 1999

(30) Foreign Application Priority Data

Dec. 1, 1998 (DE) .............................. 198 55 261

(51) Int. Cl.⁷ .................................... B64D 25/10
(52) U.S. Cl. ............... 244/141; 244/122 A; 244/122 AE
(58) Field of Search ................ 244/141, 122 A, 244/122 AB, 122 AC, 122 AD, 122 AE, 142

(56) References Cited

U.S. PATENT DOCUMENTS

| | | | |
|---|---|---|---|
| 4,395,001 | * | 7/1983 | Stone et al. .......................... 244/141 |
| 4,721,273 | * | 1/1988 | Trikha ................................. 244/141 |
| 4,792,903 | * | 12/1988 | Peck et al. ..................... 244/122 AE |
| 4,846,421 | * | 7/1989 | Trikha ................................. 244/141 |
| 5,222,695 | * | 6/1993 | Lake ............................. 244/122 AE |
| 6,114,976 | * | 9/2000 | Vian ................................ 244/122 A |

* cited by examiner

*Primary Examiner*—J. Woodrow Eldred
(74) *Attorney, Agent, or Firm*—Robert W. Becker & Associates; Robert W. Beckr

(57) ABSTRACT

For improving a method for rescuing a person sitting in an ejection seat that has ejected from an aircraft in an emergency, wherein depending on data collected by measuring apparatus arranged on the ejection seat a control device initiates deployment of stabilizing and/or braking parachutes attached to the seat and furthermore initiates separation of the person from the ejection seat, it is provided that while the connection between aircraft and ejection seat exists, current flight data for the aircraft are fed via a data bus to an ejection seat computer situated on the ejection seat and once the ejection seat has separated from the aircraft the movement data for the ejection seat in space are collected and forwarded to the ejection seat computer by a navigation platform attached to the ejection seat and, that the relevant flight data for the ejection seat are calculated in the ejection seat computer starting with flight position data for the aircraft at the time the ejection seat separated and when pre-established limits are met the stabilizing and/or braking parachutes are deployed and/or the seat/person separation is initiated.

16 Claims, No Drawings

METHOD FOR RESCUING PERSONS IN AN AIR EMERGENCY BY MEANS OF AN EJECTION SEAT

BACKGROUND OF THE INVENTION

The invention concerns a method for rescuing a person sifting in an ejection seat that has ejected from an aircraft in an emergency, wherein depending on data collected by measuring apparatus arranged on the ejection seat a control device initiates deployment of stabilizing and/or braking parachutes attached to the seat and furthermore initiates separation of the person from the ejection seat.

In terms of ejection seats in prior art, deployment of stabilizing and/or braking parachutes as well as separation of the person sitting in the ejection seat are controlled by mechanical machines, like barometrically controlled clocks, in that after the ejection seat has separated from the aircraft the rescue sequence is carried out in successive stages with deployment of stabilizing parachutes and/or braking parachutes and or seat/person separation after pre-established periods of time and depending on the measured barometric air pressure as a measure of the current altitude of the ejection seat.

This type of process is associated with the disadvantage that the deployment of the stabilizing and/or braking parachutes and the separation of the person from the ejection seat transpires without factoring in the current actual flight movement of the ejection seat, since the only variables available are the time elapsed since the ejection seat separated from the aircraft and the change in air pressure. This means that for initiating and coordinating the rescue sequence no consideration is given to whether the aircraft at the time the ejection seat deployed was located, e.g., in a mountainous region at a relatively low altitude above the ground or whether the ejection seat, e.g., deployed toward the ground while the aircraft was in an inverted flight attitude; in either of the latter situations initiation of the different stages of the rescue sequence based solely on the time and/or barometric control can lead to incorrect actuation times that are associated with a corresponding high risk to the person in the ejection seat. Furthermore, it is disadvantageous that the current speed of the ejection seat is not factored into the initiation of deployment of the appropriate parachutes so that in some cases the parachutes open, e.g., too early with a concomitant risk of damage or even that they open too late, which jeopardizes the success of rescue measures.

A further development of such an ejection seat encompasses equipping it with a dynamic airspeed indicator by means of which the change in dynamic pressure can be used to make judgments about negative acceleration, i.e., the delay in the movement of the ejection seat, so that predetermined times can be assigned for triggering initiation of the individual stages of the rescue sequence. Set in the control device that controls the rescue sequence are three time levels to be initiated that are based on the combination of high altitude/low speed, low altitude/high speed, and the aircraft on the ground (no altitude/no speed). For each alternative a window of time is established for initiating the rescue sequence so that again there is no adaptation to the current movement of the ejection seat in space.

Known ejection seats and their resultant rescue sequences are thus generally associated with the disadvantage that measurements are not taken until the ejection seat has deployed from the aircraft (and thus the control of the rescue sequence, however simple, does not begin until then); for instance, the period of time from ejection to the first possible deployment of a stabilizing and/or braking parachute is at least two seconds so that crucial time has passed before it is possible to initiate rescue measures—time that the person sitting in the ejection seat does not have, particularly in unfavorable ejection conditions.

The object of the invention is therefore to improve a method of the type specified in the foregoing such that the rescue sequence is better adapted to the actual flight and the danger to the person sitting in the ejection seat is reduced.

SUMMARY OF THE INVENTION

The basic idea of the invention is that during the flight, and thus while the connection between aircraft and ejection seat exists, current flight data for the aircraft are fed via a data bus to an ejection seat computer situated on the ejection seat and once the ejection seat has separated from the aircraft the movement data for the ejection seat in space are collected and forwarded to the ejection seat computer by a navigation platform attached to the ejection seat, and that the relevant flight data for the ejection seat are calculated in the ejection seat computer starting with flight position data for the aircraft at the time the ejection seat separated and when pre-established limits or thresholds are met the stabilizing and/or braking parachutes are deployed and/or the seat/person separation is initiated.

Thus the basic idea behind the invention is to address the ejection seat as an independent missile after it has separated from the aircraft, and the position and movement in space of the ejection seat are determined based on the current flight data for the aircraft at the time the ejection seat separates from the aircraft, which are the basic data, so that the current movement status of the ejection seat is the determining factor for controlling the individual stages of the rescue sequence. In contrast to ejection seats in the prior art, which only enable a chronologically later reaction to the conditions at ejection, the flight data for the aircraft that are stored in the ejection seat computer permit anticipatory control of the rescue sequence in that at every point in time of the flight of the aircraft potential real deployment parameters are available in the ejection seat computer that are continuously updated prior to any deployment of the ejection seat and depending on the flight of the aircraft. Thus control of a rescue sequence during an emergency can initiate immediately with deployment of the ejection seat so that even the most unfavorable eject conditions can be factored in with practically no delay by means of corresponding control of the rescue sequence.

The invention is thus associated with the advantage that the point in time for deploying, e.g., a first stabilizing parachute upon reaching an optimal speed therefor is pre-specifiable by the control device in the ejection seat that is controlled by the ejection seat computer. Deviations from this point in time can result if the aircraft at the time the ejection seat is ejected is, e.g., in an inverted flight attitude so that the ejection seat is ejected in the direction of the ground. Despite the speed of the ejection seat still being too rapid and depending on the current altitude above ground (which is also available), such a flight attitude can require that the first stabilizing parachute deploy much earlier than would otherwise be the case if optimum speed were the only factor. Likewise, the same applies for a flight orientation of an aircraft on, e.g., a curved path with the ejection seat ejected laterally. The same furthermore applies for the additional stages of the rescue sequence, like deployment of additional stabilizing and/or braking parachutes and the separation of the person from the ejection seat, which can also be triggered at an optimum speed or even barometric altitude above normal/zero or depending on the altitude of the ejection seat above ground or on its attitude in space and changes thereto. Since wind speed can be an extremely crucial variable in this regard, in accordance with one exemplary embodiment of the invention it is provided that the wind speed is detected and transmitted to the ejection seat calculator.

When in accordance with one exemplary embodiment of the invention it is provided that during the flight of the ejection seat the ambient temperature is determined and the temperatures measured are forwarded to the ejection seat computer and factored into the control of the rescue sequence, this is associated with the advantage that, e.g., when an ejection occurs at high altitude and thus at lower ambient temperature, the unbraked flight phase of the ejection seat can be extended until warmer air has been reached in order to subject the person sitting in the ejection seat to the cold for the shortest possible time. The same applies for ejection at high altitude with an oxygen deficiency in that in accordance with one exemplary embodiment of the invention the oxygen content is measured during the flight of the ejection seat so that in such a case the flight phase of the ejection seat is controlled to permit the person sitting therein to reach air with adequate oxygen content as rapidly as possible.

In the same manner the control can also be designed such that in general the drop time for the person to be rescued after separation from the ejection seat is as short as possible in order to avoid the threat of hostile fire during an extended parachute-flight phase. An overlaid time control can factor in such an objective.

When in accordance with one exemplary embodiment of the invention it is provided that the map data for the geographic flight region maintained in the aircraft computer are fed into the ejection seat computer and the calculation of the point in time for deploying the stabilizing and/or braking parachutes and/or the seat/man separation are factored in, this results in the advantage that the point in time for initiating the individual stages of the rescue sequence is also prespecifiable depending on geographic data from the control device of the ejection seat in that, e.g., if the ejection seat is ejected over a body of water or flat terrain, more time is available for implementing the rescue sequence than in mountainous terrain with approaching chains of mountains relative to the flight movement of the ejection seat. In this context it can be useful in accordance with one exemplary embodiment of the invention to feed the aircraft's speed over ground as flight data to the ejection seat computer, because experience indicates that the speed of the aircraft and its relative speed in relation to the ground can be different due to wind currents. Thus if map data are used in preliminary calculations of the flight path of the ejection seat, the speed of the aircraft over ground must be available in order to be able to determine the geographic position or change in position of the ejection seat.

In accordance with one exemplary embodiment of the invention it is provided that the ejection seat computer controls the ejection of the ejection seat in terms of the strength of the eject impulse and/or by the direction of ejection depending on the aircraft flight data available to it. It is therefore advantageously possible for the ejection seat computer, depending on the aircraft flight data, to determine the conditions for ejection when such ejection is initiated as a result of aircraft flight data or even during a pilot-initiated ejection of the ejection seat. Thus the ejection can be introduced with different ejection seat acceleration depending on, e.g., aircraft altitude and whether additional altitude will be required upon ejection. On the other hand, in the case of inverted flight of the aircraft, addressed in the foregoing, a strong eject impulse is not required. The same also applies to the direction of the ejection when, e.g., a thruster ignites immediately after ejection in order to determine the direction of the ejection seat and thus to provide an initial flight path determined by the ejection seat computer.

When it can additionally be provided that the flight path of the ejection seat in space is calculated in advance based on the aircraft flight data taken from the aircraft and on the data determined by the navigation platform and that the point in time is calculated for deployment of the stabilizing and/or braking parachutes and/or seat/man separation, this makes it possible that a correction can be made to the flight path of the ejection seat by means of the drive systems attached to the ejection seat and depending on the flight data for the ejection seat calculated by the ejection seat computer. It is therefore possible, e.g., when an ejection seat has been ejected under very unfavorable conditions, to afford the ejection seat higher altitude and/or another flight path that would have been different had there not been such a correction.

An ejection seat designed for performing the rescue sequence is provided an ejection seat computer and when connected to the aircraft comprises a data bus connected to the flight computer and furthermore comprises a navigation platform that in accordance with one exemplary embodiment of the invention embodies an inertial measuring device. In accordance with one exemplary embodiment of the invention, the ejection seat can furthermore comprise thrusters for controlling and correcting its flight path. Additionally, the ejection seat can be provided with a thermometer for measuring the ambient temperature and can furthermore be provided with an oxygen device for determining the oxygen content in the ambient air.

The foregoing features of the subject of this document as described in the specification, claims, and abstract can be essential individually and in any desired combination for realizing the invention it its various embodiments.

What is claimed is:

1. A method for rescuing a person sitting in an ejection seat that has ejected from an aircraft in an emergency, wherein depending on data collected by measuring apparatus arranged on the ejection seat a control device initiates deployment of stabilizing or braking parachutes attached to the seat and furthermore initiates separation of the person from the ejection seat, said method including the steps of:

while the connection between aircraft and ejection seat exists, feeding current flight data for the aircraft via a data bus to an ejection seat computer situated on the ejection seat;

after the ejection seat has separated from the aircraft, collecting movement data for the ejection seat in space;

forwarding said movement data to said ejection seat computer by a navigation platform attached to the ejection seat;

calculating the relevant flight data for the ejection seat in said ejection seat computer starting with flight position data for the aircraft at the time the ejection seat separated; and effecting at least one of deploying stabilizing or braking parachutes and initiating separation of a person from said ejection seat when said data collected by said ejection seat computer meets predetermined threshold values of selected parameters.

2. A method according to claim 1, wherein said step of feeding current flight data to said ejection seat computer includes feeding data concerning the attitude of the aircraft in space, the effective altitude above the ground, and the speed.

3. A method according to claim 2, wherein said aircraft flight data fed to said ejection seat computer includes wind speed.

4. A method according to claim 1, wherein movement and change in attitude in space of said ejection seat as well as its accelerations are determined by means of said navigation platform and are fed to said ejection seat computer.

5. A method according to claim 1, wherein during flight of the ejection seat, ambient temperature is measured and the measured temperatures are forwarded to said ejection seat computer.

6. A method according to claim 1, wherein during flight of the ejection seat, oxygen content in the ambient air is measured and the measurements taken are forwarded to said ejection seat computer.

7. A method according to claim 1, wherein map data for a pertaining geographic flight region maintained in a computer of the aircraft are fed into said ejection seat computer and are factored in for a calculation of the point in time for and the control of deployment of stabilizing or braking parachutes and initiating separation of a person from said ejection seat.

8. A method according to claim 7, wherein aircraft flight data fed to said ejection seat computer includes speed of the aircraft above ground.

9. A method according to claim 1, wherein a flight path of the ejection seat in space is calculated in advance based on aircraft flight data taken from the aircraft and on the data determined by said navigation platform and the point in time is calculated for deployment of stabilizing or braking parachutes and initiating separation of a person from said ejection seat.

10. A method according to claim 1, wherein said ejection seat computer controls ejection of the ejection seat in terms of the strength of an eject impulse or by a direction of ejection depending upon aircraft flight data available to it.

11. A method according to claim 1, wherein correction can be made to a flight path of the ejection seat by means of drive systems attached to the ejection seat and as a function of flight data for the ejection seat calculated by said ejection seat computer.

12. An ejection seat for carrying out the method of claim 1, wherein said ejection seat has a computer and, while connected to said aircraft, has a data bus connected to a flight computer and furthermore has a navigation platform.

13. An ejection seat according to claim 12, wherein said navigation platform is an inertial measuring device.

14. An ejection seat according to claim 12, wherein said ejection seat is provided with thrusters for correcting its flight path.

15. An ejection seat according to claim 12, wherein said ejection seat is provided with a thermometer for measuring ambient temperature.

16. An ejection seat according to claim 12, wherein said ejection seat is provided with oxygen-measuring equipment.

* * * * *